Patented Nov. 11, 1930

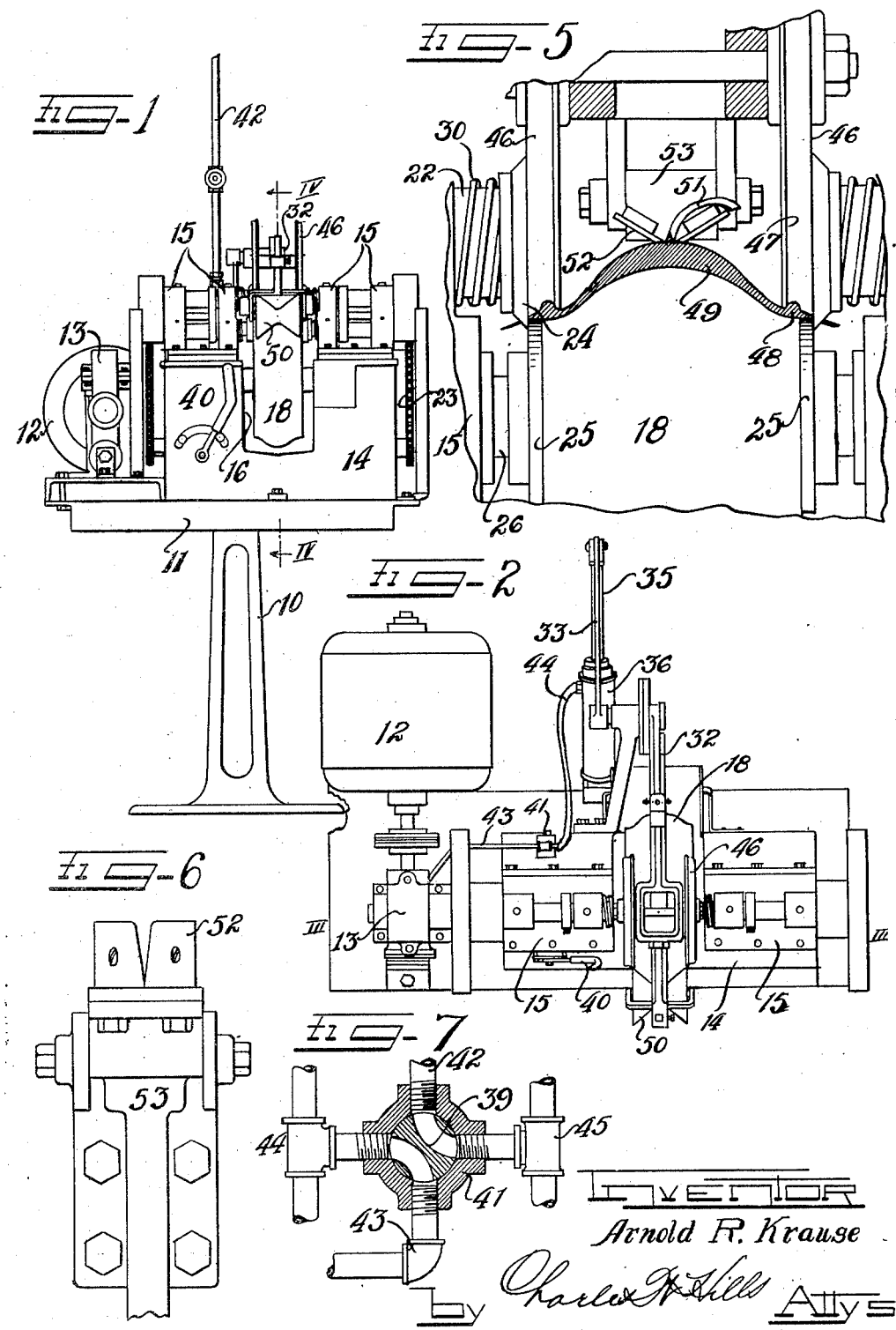

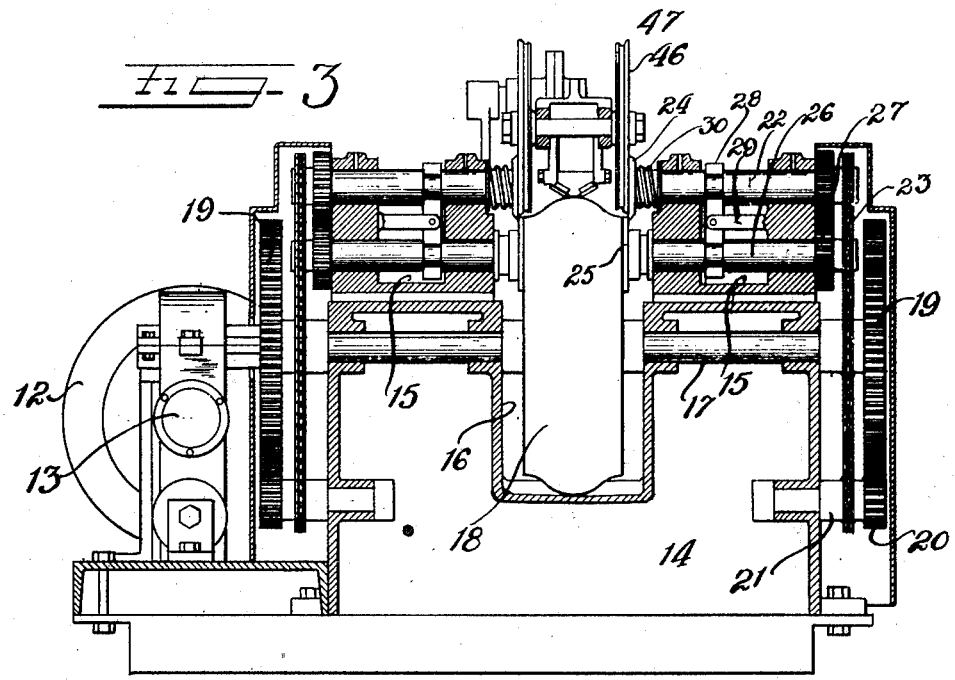
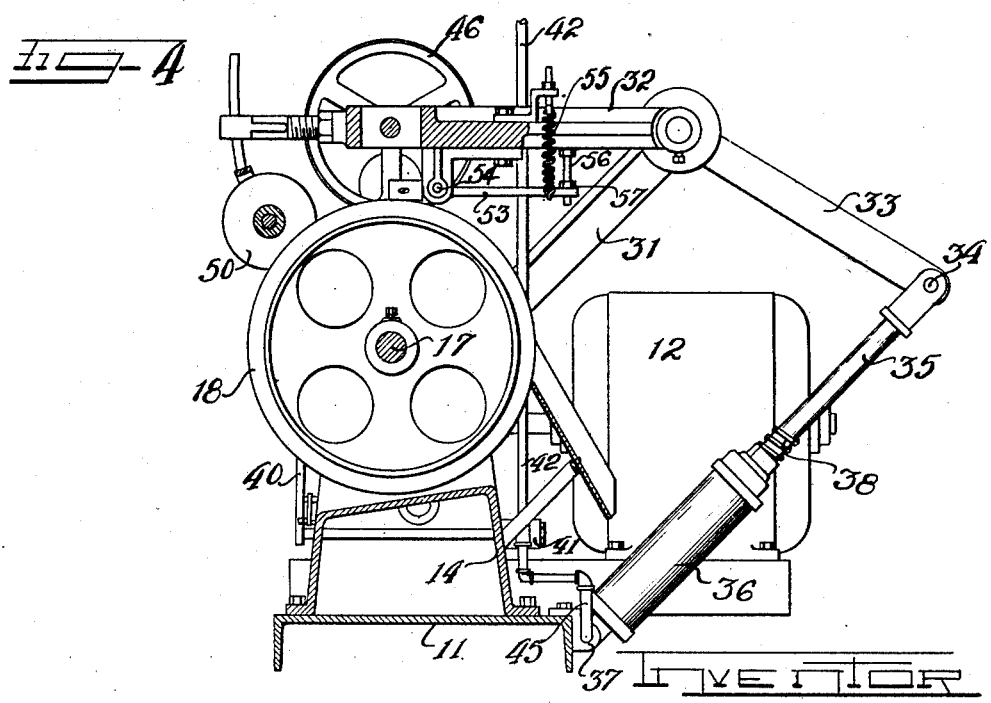

1,781,398

UNITED STATES PATENT OFFICE

ARNOLD R. KRAUSE, OF EAU CLAIRE, WISCONSIN, ASSIGNOR TO GILLETTE RUBBER COMPANY, A CORPORATION OF WISCONSIN

BICYCLE-TIRE TRIMMER

Application filed August 18, 1927. Serial No. 213,763.

This invention relates to an improved machine for trimming the rough edges and flash formed on vulcanized tire casings due to the joints required in the vulcanizing molds which permit the rubber to spread out as fins between the joints.

It is an object of this invention to provide an improved machine of the class described wherein provision is made for rapid insertion and removal of the tire casings as well as the accurate guiding and centering of the completed casing.

It is also an object of the invention to provide improved coacting trimming knives wherein one knife is spring urged towards its coacting shear at the same time as the shear is drawn towards the knife by a balancing mechanism between the driving shafts of the knife and shear.

It is another object of this invention to provide a driven spreading core adapted to spread out a tire carcass into position for trimming the edges thereof, a pressure roller and side guide rollers serving to accurately spread out and center the tire carcass on the core. It is also an object of this invention to provide mounting means for the parts bearing down on the tire carcass, the mounting means including a quick acting mechanism for swinging the operating parts out of the way.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a machine embodying the feature of this invention, this view being taken from the operator's position.

Figure 2 is a top plan view of Figure 1.

Figure 3 is a section on the line III—III of Figure 2, with parts shown in elevation.

Figure 4 is a section on the line IV—IV of Figure 1 partly shown in elevation.

Figure 5 is an enlarged fragmentary section of a tire carcass in positon in the trimming knives.

Figure 6 is a fragmentary bottom view of the center trimming knives carried by the overhanging pivoted arm.

Figure 7 is a detail section of the fluid control valve.

As shown on the drawings:

A standard or pedestal 10 supports a bed plate 11 on which is mounted a driving motor 12 with a worm gear box 13 together with a housing 14 having twin pedestals 15 defining a gap 16 therebetween. A shaft 17 extends from the gear box 13 through the twin pedestals 15, this shaft carrying a core pulley 18 in the gap 16 as well as driving gears 19 on the outer sides of each pedestal 16. Attention is directed to the fact that the housing 14 is of such a size that an entire carcass 49 may be slipped endwise over the same and onto the pulley 18. The gears 19 mesh with small pinions 20 on stub shafts 21 which in turn drive upper trimmer shafts 22 by means of chains 23, so that the under side of the trimmer shafts 22 move in the same direction as the surface of the core pulley 18, thus tending to draw the work under the trimmers proper.

Each trimmer shaft 22 carries a circular trimming knife 24 which overlies and coacts with the edge of a disk type of shear 25 mounted on a shaft 26 driven by gears 27 from the shaft 22. The shafts 22 and 26 are longitudinally movable in their bearings and are held in position by a double balance or equalizing collar 28 fitting into grooves in each shaft and pivoted midway between the shafts on a bracket 29. A spring 30 is mounted on the shaft 22 between the knife 24 and the housing, this spring urging the knife shaft outwardly, the force being transmitted through the balance or equalizing collar to the shear shaft 26 which is thus urged inwardly, the net result of this structure being to urge the knife against the side of the shear disc without shifting the cutting line of the assembly.

A rearwardly and upwardly extending bracket 31 forms a support for an arm 32 pivoted thereto, a rearward extension 33 of the arm being pivoted at 34 to the end of a piston rod 35 operating in a fluid cylinder 36 pivoted at 37 to the bed plate 11. A spring buffer 38 is provided to take the shock at the end of the travel of the piston rod. The fluid cylinder is operated by a two way valve 39 at the back of the bed, the valve being operated by a lever 40 in front. The valve body 41 has supply and exhaust pipes 42 and 43 with connections 44 and 45 to the top and bottom of the fluid cylinder.

The arm 32 carries a pair of wheels 46 having grooves 47 adapted to fit over the beads 48 of a tire carcass 49 spread out over the core 18 as shown in Figure 5, the beads being supported both by the core 18 and the shear discs 25. These wheels 46 assure that the tire carcass will be accurately centered on the core. The tire carcass is further pressed down by a formed roller 50 adjustably carried in the extreme end of the arm 32.

The arm 32 also carries a trimming mechanism for the central fin 51 commonly found on tire carcasses vulcanized in split molds, this mechanism comprising opposed knives 52 set to form a V notch into which the fin moves as the carcass rotates. These knives are carried by a lever 53 pivoted beneath the arm 33 at 54, the other end of the lever being arranged to receive a pair of springs 55 which pull it towards the arm 33. A stud 56 with a nut 57 serves as a limiting stop, the adjustment of which determines the cutting depth of the knives 52.

In the operation of this machine, the arm 33 is raised by suitable manipulation of the fluid cylinder control valve 39 and a tire carcass is placed on the core, whereupon the arm is lowered into place with the wheels 46 engaging the tire beads. The tire carcass is placed on the pulley by sliding the carcass over one end of the housing 14 so that the upper portion of the carcass rests on the pulley and the lower portion hangs under the bed plate 11. Upon rotation of the core, the trimming mechanisms rotate at higher speed than the core and trim the edges of the beads as the carcass is moved therepast. At the same time, the central fin 51 is trimmed off.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A machine of the class described comprising a gap bed having opposed and aligned housings on each side of the gap, a driving shaft in said bed and spanning said gap, a core shaped to receive a tire carcass and mounted on said shaft in position in said gap, a set of co-acting rotary trimming cutters mounted on the housing on each side of said core, and balanced pressure means equally urging the coacting trimming cutters toward each other and into cutting positions, said latter means being axially aligned with the associated cutters.

2. A machine of the class described comprising a gap bed having opposed and aligned housings on each side of the gap, a driving shaft in said bed and spanning said gap, a core for receiving a tire carcass and mounted on said shaft in position in said gap, pairs of co-acting rotary trimming cutters mounted on the housing and disposed parallel to each other and to said core, said pair of cutters being arranged so that there is a pair on each side of the core, and means bearing down upon the carcass of a tire on said core to spread it out in alignment with the cutters, said latter means being formed to fit over the beads on the carcass.

3. A machine of the class described comprising a gap bed having opposed and aligned housings on each side of the gap, a driving shaft in said bed and spanning said gap, a core for receiving a tire carcass and mounted on said shaft in position in said gap, co-acting rotary trimming cutters mounted on the housing on each side of said core and disposed parallel to each other and to said core, means bearing down upon the carcass of a tire on said core to spread it out in alignment with the cutters, and means connected to and movable with said last mentioned means arranged to trim off the central fin on the carcass.

4. A machine of the class described comprising a gap bed having opposed and aligned housings on each side of the gap, a driving shaft in said bed and spanning said gap, a core shaped to receive a tire carcass and mounted on said shaft in position in said gap, pairs of co-acting rotary trimming cutters mounted on the housing and disposed parallel to each other and to said core, said pairs of cutters being arranged so that there is a pair on each side of the core, an arm positioned above said core, and grooved wheels carried by said arm arranged to engage the beads of a spread out tire carcass, said wheels being movable by said arm toward and from the tire carcass in planes substantially parallel to that of the carcass.

5. A machine of the class described comprising a gap bed having opposed and aligned housings on each side of the gap, a driving shaft in said bed and spanning said gap, a core shaped to receive a tire carcass and mounted on said shaft in position in said gap, co-acting rotary trimming cutters mounted on the housing on each side of said core, an arm positioned above said core, and grooved wheels carried by said arm arranged to engage the beads of the spread out tire carcass on said core, and a trimmer yieldingly carried by said arm and positioned to remove the central fin from the tire carcass.

6. In a machine of the class described, a driven core so formed as to spread out a tire carcass, co-acting trimming means positioned on each side of said core to trim the peripheral edges of the beads of the tire carcass, axially aligned means for forcing said trimming means toward each other and into cutting positions and roller means aligning and pressing said tire carcass with and on said core.

7. In a machine of the class described, a driven core so formed as to spread out a tire carcass, coacting trimming means positioned on each side of said core to trim the peripheral edges of the beads of the tire carcass, axially aligned means for forcing said trimming means toward each other and into cutting positions roller means arranged to align and press said tire carcass with and on said core, and fluid actuated means for elevating said roller means from said tire carcass.

8. In a machine of the class described, a driven core so formed as to spread out a tire carcass, coacting trimming means positioned on each side of said core to trim the outspread beads of the tire carcass, a pivotally supported arm having roller means thereon to press the tire carcass on said core, and trimming means carried by said arm and supported directly over the central fin of the carcass for removing said fin from the carcass.

9. In a machine of the class described, a core member shaped to have a tire carcass suspended thereon, means for spreading and holding said carcass on said core, said means including elements formed to engage over the beads of the carcass, means for cutting the fin on the tread of the carcass, an arm pivotally disposed over said carcass for supporting said elements and cutting means and means for cutting the peripheral portions of said carcass adjacent said beads.

10. In a machine of the class described, a core member shaped to have a tire carcass suspended thereon, means for spreading and holding said carcass on said core, and means for cutting the central fin from said tire carcass comprising a pair of cutting blades arraged to fit over and engage the sides of the fin.

In testimony whereof I have hereunto subscribed my name at Eau Claire, Eau Claire County, Wisconsin.

ARNOLD R. KRAUSE.